Figure 1:
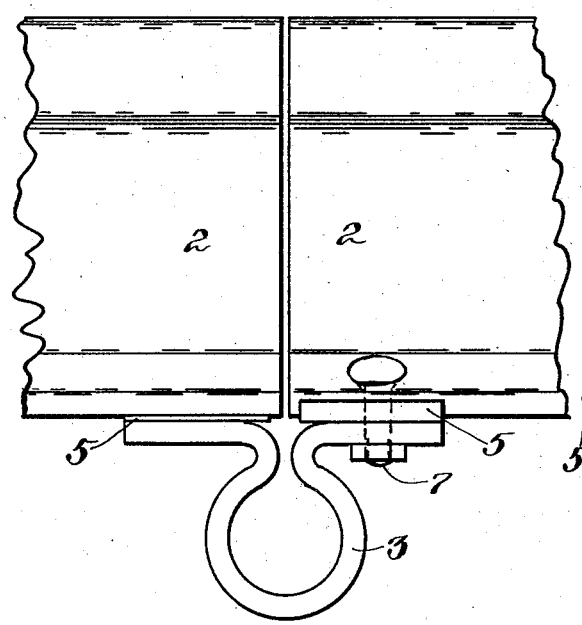

No. 772,189. PATENTED OCT. 11, 1904.
E. G. THOMAS.
METHOD OF ATTACHING RAIL BONDS TO RAILS.
APPLICATION FILED JULY 29, 1903.
NO MODEL.

WITNESSES
E. D. Chadwick.
Arthur F. Randall

INVENTOR
Edward G. Thomas

No. 772,189.

Patented October 11, 1904.

UNITED STATES PATENT OFFICE.

EDWARD G. THOMAS, OF WALTHAM, MASSACHUSETTS.

METHOD OF ATTACHING RAIL-BONDS TO RAILS.

SPECIFICATION forming part of Letters Patent No. 772,189, dated October 11, 1904.

Original application filed March 19, 1903, Serial No. 148,525. Divided and this application filed July 29, 1903. Serial No. 167,393. (No model.)

*To all whom it may concern:*

Be it known that I, EDWARD G. THOMAS, a citizen of the United States, residing at Waltham, in the county of Middlesex and State of Massachusetts, have invented a new and useful Method of Attaching Rail-Bonds to Rails, of which the following is a specification.

My invention relates to the art of electrically connecting the rails of electric railways by means of flexible conductors or rail-bonds, and has to do more particularly with that class of rail-bonding constructions in which the bonds are soldered to the bottoms of the rails.

In soldering rail-bonds to the bottom surfaces of a pair of rails it has been customary, first, to tin the surfaces of those portions of the rails to which the bond is to be applied, then to clamp the bond to the rails, then to heat the rails and bond, and, finally, to apply the flux and solder. The parts are then allowed to cool and the clamps are removed. This process has proved in practice to be difficult and expensive, owing to the horizontal position and almost inaccessible location of the surfaces to be soldered together and to the tendency of the melted solder to fall away from the parts to which it is applied or to run back along the unmelted bar of solder instead of adhering at the point of application. This process has also involved a considerable waste of solder on account of the tendency of the melted solder to flow over or around the exterior of the parts to be soldered rather than in between the same. Owing to these difficulties, it has become customary to join a number of rails together and tip them bottom side up and then to bond them while in this position, the section of rails thus bonded being then turned upright and set in place on the ties. Even with this method of procedure, however, the section of rails thus bonded must still be connected to the adjacent sections, so that the difficulties above pointed out can be only partially overcome in this manner.

My present invention is intended to provide an improved method of soldering rail-bonds to rails whereby rails may readily be bonded on their bottom surfaces after having been set in place on the ties, and my method is herein illustrated and described as employed in the application of a rail-bond such as is described and claimed in another application for Letters Patent, filed by me on the 19th day of March, 1903, Serial No. 148,525, of which application this present application is a division.

My rail-bond above referred to has a flexible portion of any desired construction and at its points of attachment is provided with supplementary conducting-strips forming or providing the attaching-surfaces to be soldered to the rails, said surfaces being extended laterally beyond the edges of the bond proper on one or both sides thereof and being made flexible for a purpose hereinafter described. To secure this bond to the rails according to my present method, after the rails have been set in place on the ties I clamp the bond to the bottom surfaces of the rails with the attaching-strips above referred to in capillary relationship with said surfaces and extending a short distance beyond the edge of the rail-flanges, thus forming at each point of attachment a projecting horizontal ledge. I then heat the parts to be joined and apply the flux and a quantity of melted solder to the ledges above referred to, which ledges retain the solder until the latter flows or is drawn by capillary attraction in between the meeting surfaces of the attaching-strips and rails, whereupon the parts are allowed to cool and the clamps are then removed. By preference before applying the flux and solder I bend each of the flexible projecting ledges slightly upward and also bend its ends inward against the edge of the rail, thus forming a sort of cup-shape receptacle which prevents the solder from escaping or flowing in any other direction than in between the adjacent surfaces of the attaching-strip and rail.

The bond above referred to and my method of attaching the same are illustrated in the accompanying drawings, in which—

Figure 2:
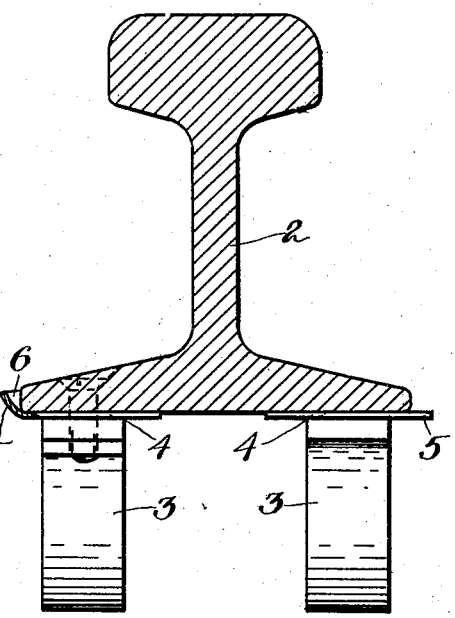
Figure 3:
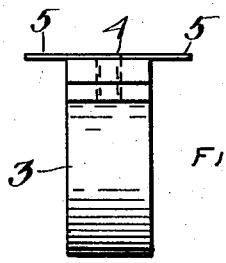

Figure 1 is a side elevation of the adjacent ends of a pair of rails with the bond secured to the bottoms thereof. Fig. 2 is a transverse vertical section through one of the rails, showing in end elevation two bonds applied to the edges thereof. Fig. 3 is an end view of the bond itself before it is applied to the rails.

In the drawings, 2 2 represent the adjacent ends of a pair of rails, and 3 represents a bond having a flexible portion of any desired construction and provided at its points of attachment with inelastic conducting-strips 4 4, usually made of copper, each of which projects laterally beyond the edge of the bond proper and is made thin enough to be readily flexible at this projecting portion. This bond is applied to the rails, as indicated in Fig. 2, with the flexible edges 5 5 of the strips 4 4 projecting sufficiently beyond the rail-flanges to form solder-retaining ledges. The clamps employed are not shown, their construction being well known. The bond at the left in Fig. 2 is shown as having its ledges bent upward and also bent inward at their ends to fit the edges of the rail-flanges, thus forming receptacles 6, into which the flux and solder are run during the process of attachment, as above described. I have found, however, that even if the edges of the strips 4 4 are not bent upward, but are left flat, as shown at the right in Fig. 2, the flat ledges thus provided will still retain melted solder in sufficient quantity to provide for the ready application of the bond, and I consider this mode of attachment to be within the scope of my invention. It will be evident that when it is not desired to bend the ledges upward, as above described, the attaching-surfaces of the bond may be rigid.

The strips 4 are preferably made to project beyond both edges of the bond proper, as shown in Fig. 3, in order that it may be immaterial which edge of the bond is adjacent to the edges of the rail-flanges and also in order to insure an ample attaching and conducting area between the bond and the rails.

In addition to the solder as a means of attachment it is usual in some cases to employ bolts or rivets passing through the rail-flanges and the ends of the bond. Such a bolt is shown at 7 and is applied in a well-known manner.

My method renders it unnecessary to tin the attaching-surfaces of the rails, as has been the common practice heretofore; but the strips 4 4 of the bond are preferably tinned on their attaching-surfaces when the bond is made.

The bond herein described is not claimed in this application, being claimed in my application Serial No. 148,525, above referred to.

I claim as my invention—

1. The herein-described method of securing a rail-bond to the bottom of a rail, which consists in clamping the bond to the bottom of the rail in capillary relationship therewith, and with one side of the attaching-surface of the bond projecting beyond the rail-flange in position to support melted solder, heating the parts to be soldered, applying the soldering materials to the top of said projecting portion of the bond until said materials flow in between the meeting surfaces, and permitting the parts to cool while clamped together.

2. The herein-described method of securing a rail-bond to the bottoms of a pair of rails, which consists in clamping the bond to the bottoms of the rails in capillary relationship therewith, and with the side edges of the attaching-surfaces projecting beyond the rail-flanges, bending the said projecting edges upward and inward to form a receptacle, heating the parts to be soldered, running the soldering materials into said receptacles, and allowing the parts to cool while clamped together, substantially as described.

In testimony whereof I have hereunto subscribed my name this 25th day of July, 1903.

EDWARD G. THOMAS.

Witnesses:
E. D. CHADWICK,
JOSEPH T. BRENNAN.